United States Patent [19]
Annis

[11] 3,733,920
[45] May 22, 1973

[54] TRANSMISSION AND HYDRAULIC SOURCE

[75] Inventor: Robert E. Annis, Howell, Mich.

[73] Assignee: General Motors Corporation, Detroit, Mich.

[22] Filed: Aug. 16, 1971

[21] Appl. No.: 172,109

[52] U.S. Cl. .................................. 74/763, 74/731
[51] Int. Cl. ..................... F16h 57/10, F16h 47/00
[58] Field of Search .................. 74/763, 762, 730, 74/731, 732

[56] References Cited
UNITED STATES PATENTS

| | | |
|---|---|---|
| 3,599,512 | 8/1971 | Wagman .................................. 74/763 |
| 3,199,374 | 8/1965 | O'Malley et al. ........................ 74/688 |
| 3,494,223 | 2/1970 | Mori ....................................... 74/688 |

Primary Examiner—Arthur I. McKeon
Attorney—W. E. Finken, A. M. Heiter and D. F. Scherer

[57] ABSTRACT

A transmission having a positive displacement pump for supplying fluid pressure to the transmission control and accessory devices such as power steering. The pump is driven by the input shaft during normal operation when the engine is running. However, when the engine is not running and the vehicle is moving a drive connection between the output shaft and the input shaft is established through self-energizing mechanisms in the transmission input clutches. These self-energizing mechanisms engage one or more input clutches to provide a drive connection between the output shaft and the pump during the engine off coast condition regardless of the transmission drive mode previously selected or the direction of vehicle movement.

3 Claims, 3 Drawing Figures

PATENTED MAY 22 1973

3,733,920

INVENTOR.
Robert E. Annis
BY
Donald F. Scherer
ATTORNEY

TRANSMISSION AND HYDRAULIC SOURCE

This invention relates to transmissions having a fluid source driven by the input shaft and more particularly to transmissions having self-energizing clutches to maintain the fluid source operable during engine off coast drive.

Prior art devices for maintaining a fluid source operable during engine off coast condition include positive displacement pumps driven by the output shaft or one-way devices operatively connecting the output shaft directly with the input shaft of the transmission or an alternate electrical drive to provide a back up drive system for the fluid power source. These devices are generally more expensive to manufacture or require special transmission arrangements. The transmission disclosed herein includes ball ramp type one-way devices which self-energize one or both of the transmission input clutches during an engine off coast condition to provide what is normally termed a turbine back-up drive. Thus, this back-up drive system can be incorporated in most automatic transmissions with minimum cost. The self-energizing mechanisms in the preferred embodiment are incorporated into a known transmission. This arrangement will provide a coast drive with the vehicle moving either forward or backward with the transmission manual selector in either drive, reverse or neutral.

It is an object of this invention to provide in an improved transmission a fluid source and mechanical energizing mechanisms on the input clutches to provide a back-up drive from the output shaft to the input shaft during all transmission coast conditions to maintain the fluid source operable.

Another object of this invention is to provide in an improved transmission having forward, neutral and reverse drives and including a pump driven by the input shaft and mechanical self-energizing mechanisms which provide an apply force for the input clutches to establish a back-up drive during engine off coast drive conditions in all of the transmission drives including neutral to maintain the pump operable.

These and other objects and advantages of the present invention will be more apparent from the following description and drawings in which.

Figure 1:
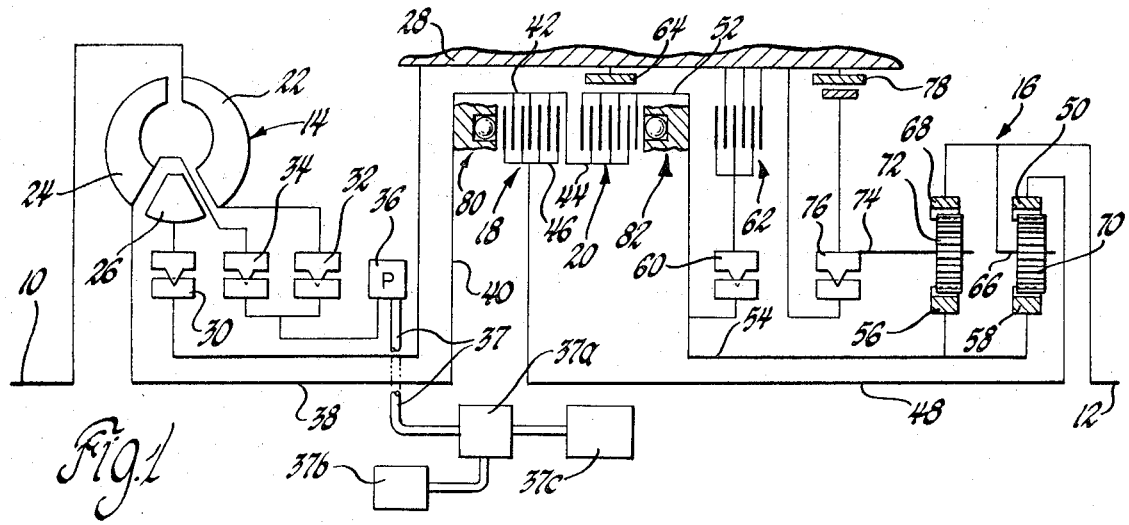
FIG. 1 is a schematic representation of a transmission.

Referring to the drawings wherein like characters designate like or corresponding parts throughout the several views there is shown in FIG. 1 a power transmission including input shaft 10, an output shaft 12, a torque converter 14, a planetary gearing arrangement 16 and a pair of input clutches 18 and 20. The output shaft 12 is drivingly connected to the vehicle wheels, not shown, by a conventional drive shaft and differential gearing. The torque converter 14 includes an impeller 22 driven by the input shaft 10, a turbine 24 and a stator 26 which is connected to the transmission case 28 through a one-way device 30. The pump 22 and turbine 24 are connected by one-way drive devices 32 and 34 respectively to a conventional positive displacement pump 36 which supplies fluid pressure in a conventional manner to operate the clutches and brakes of the transmission. A more detailed description of the torque converter 14, and the one-way drives 32 and 34 can be found in United States Ser. No 122,041 now U.S. Pat. No. 3,665,707 filed in the name of E. A. Koivunen and assigned to the assignee of this application.

The pump 36 supplies fluid pressure through a passage 37 to a control valve 37a which distributes fluid to a steering gear 37b and a transmission control 37c. The transmission control 37c may be identical with that shown in U.S. Pat. No. 3,321,056 issued May 23, 1967 to Winchell et al. The power steering system 37b may be of the type disclosed in U.S. Pat. No. 3,022,772 issued Feb. 27, 1962 to Ziegler et al. The control valve 37a may be similar to that disclosed in United States Ser. No. 29,090 now U.S. Pat. No. 3,641,879 filed Apr. 16, 1970, which is assigned to the assignee of the instant application. As disclosed in the last mentioned Serial Number, the power steering pump 36 supplies fluid pressure for both the transmission control and the power steering system. Therefore, it is desirable to maintain the pump 36 operable when the vehicle is moving. This is accomplished through a turbine back up drive including self-energizing clutch mechanisms as described below. When the pump 36 is driven, the converter 14 will be filled with fluid, thereby providing a drive connection between the vehicle wheels and the vehicle engine. Thus, the back up drive will also permit push starting of the vehicle.

The turbine 24 drives an input shaft 38 which is connected through a hub 40 to drive an outer hub 42 and an inner hub 44 of the input clutches 18 and 20, respectively. An inner hub 46 of clutch 18 is connected by a shaft 48 to a ring gear 50 of the planetary gearing arrangement 16. An outer hub 52 of the input clutch 20 is connected via shaft 54 to a pair of sun gears 56 and 58 of the planetary gear set 16. The hub 52 and shaft 54 are also connected via a one-way brake 60 to a selectively operable friction brake 62 which is operatively connected with the transmission housing 28. The hub 52 may also be selectively held stationary by a band type brake 64 which is operatively connected with the transmission housing 28. The output shaft 12 is drivingly connected to a carrier 66 and a ring gear 68 which are members of the planetary gearing 16. The planet carrier 66 rotatably supports a plurality of planet pinions 70 which mesh with the sun gear 58 of the ring gear 50. The sun gear 56 is operatively connected with the ring gear 68 through a plurality of planetary pinions 72 which mesh therewith and are rotatably mounted on a planet carrier 74 which is operatively connected through a one-way device 76 with the transmission housing 28 and through a selectively operable band brake 78 with the transmission housing 28. The gearing arrangement shown herein is described in detail in the United States Patent issued to Winchell et al. U.S. Pat. No. 3,321,056 and reference may be had thereto to determine the detailed operation of the transmission. It is sufficient here to note that the transmission will provide three forward speeds and a reverse speed by selective operation of the various clutches and brakes. A suitable control for the operation of the clutch and brakes is also found in Winchell et al.

The transmission as described in Winchell et al. will not provide a back up drive from the output shaft 12 to the torque converter 14 if the positive displacement pump 36 is not driven by the input. The transmission shown in FIG. 1 differs from Winchell in that mechanical engaging or energizing mechanisms 80 and 82 disposed in input clutches 18 and 20, respectively, will initiate a clutch engagement to permit a back up drive between the output shaft 12 and the torque converter 14 when the positive displacement pump 36 is not being driven.

Figure 2:
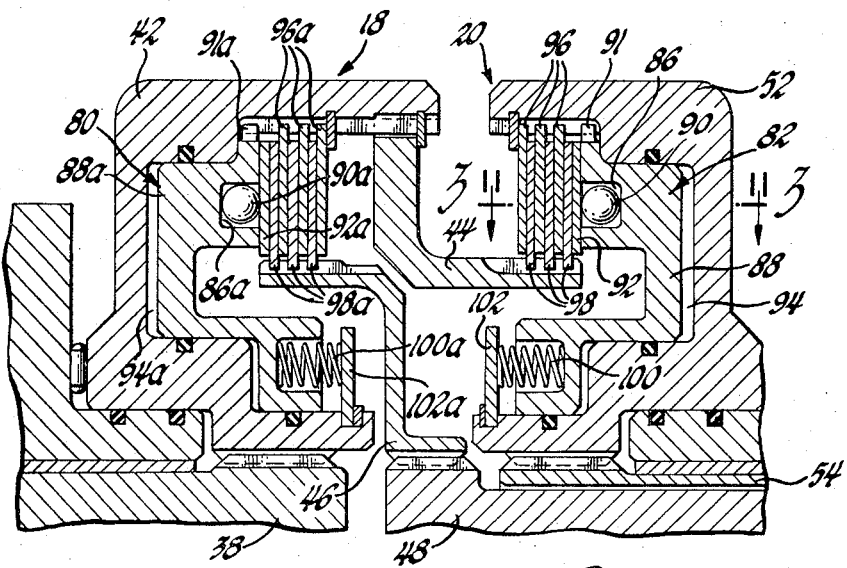
FIG. 2 is a cross-sectional elevational view of the input clutches of the transmission shown schematically in FIG. 1.
Figure 3:
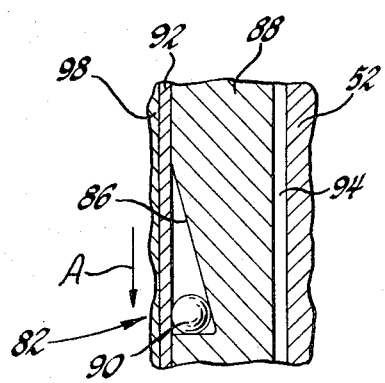
FIG. 3 is a sectional view of the ball and ramp taken along line 3—3 of FIG. 2.

The engaging mechanisms 80 and 82 shown in FIGS. 2 and 3, are similar in construction to the type disclosed in O'Malley et al., U.S. Pat. No. 3,199,374 granted Aug. 10, 1965. The engaging mechanism 82 is disposed in the input clutch 20 and includes a ramp 86 formed in a clutch piston 88 which is slidably mounted in the hub 52 and a ball 90 disposed adjacent the ramp 86. The clutch piston 88 is drivingly connected to the hub 52 by a plurality of splines 91 spaced about the periphery thereof and engaging splines in the hub 52. The ball 90 abuts a free floating plate or disc 92 which normally rotates with the piston 88. When the clutch 20 is not engaged, relative rotation occurs between friction discs 96 drivingly connected to the hub 52 and friction discs 98 drivingly connected to the hub 44. Slippage also occurs between disc 92 and friction disc 98 adjacent thereto. In normal operation, the clutch 20 is engaged by fluid pressure admitted to a chamber 94 formed between the housing 52 and the piston 88. When the fluid chamber 94 is pressurized the piston 88 urges the disc 92 toward friction disc 98 to cause a friction engagement between disc 92 and friction disc 98 and also between the disc 96 and the discs 98 thus providing a drive connection between shaft 38 and the shaft 54. When the chamber 94 is not pressurized a plurality of coil springs 100 compressed between a piston 88 and a washer 102 secured in the hub 52 urges the piston away from the friction disc to disengage the clutch 18. In the disengaged position the ball 90 still contacts the ramp 86 and the disc 92 with a slight force.

The clutch 18 and the mechanical energizing mechanism 80 are similar in design and structure to the clutch 20 and the energizing mechanism 82 so that the corresponding parts have been given the same numerical designation with an "a" suffix. The ramps 86 are arranged so that three or more may be placed in three separate locations around the piston 88. The ramp 86 and the ball 90 apply a light preload force to the clutch 20 through the disc 92 so that a light drag pressure is applied between the disc 92 and the disc 98. However, when the hub 52 and piston 88 are driven by the output shaft 12 through the gearing 16 and shaft 54, such as when the vehicle is coasting with the engine stalled or when the vehicle is being pushed, the piston 88 will be rotated in the direction of arrow A shown in FIG. 3 relative to the disc 92 to cause the ball 90 to roll up the ramp 86. As the ball 90 moves up the ramp 86 the disc 92 will move away from piston 88 thereby causing the friction discs 96 and 98 to be engaged with increasing force thereby engaging the clutch 20. The clutch is controlled and its capacity is limited by the angle of ramp 86 as disclosed in more detail in O'Malley et al., U.S. Pat. No. 3,199,374.

The mechanical engaging mechanism 80 is similar to the mechanism 82. Its operation is the same with the exception that in the clutch 18 the disc 98a is driven by the output shaft when the vehicle is in a back up drive condition so that the friction disc 98a driven by the hub 46 initiates movement of the ball 90a to energize the clutch 18 while in clutch 20 movement of the piston 88 relative to the disc 92 initiates movement of the ball 90 to energize the clutch.

Assuming the transmission selector has been positioned or conditioned for neutral operation and the vehicle beings to moving in a forward direction, the output shaft 12 will be driven forwardly as will the carrier 66 of the ring gear 68. This will cause the sun gears 56 and 58 to be driven in a forward direction and the ring gear 50 to be driven in a forward direction. The ring gear 50 drives the shaft 48 and hub 46 in a forward direction more rapidly than the hub 42 is driven by the input shaft 38 which is stationary thereby causing engagement of the clutch 18 through the self-energizing mechanism 80. The shaft 54 and hub 52 will be driven in a forward direction by the sun gears 56 and 58 to cause the self-energizing mechanism 82 to engage the clutch 20. The clutches 18 and 20 will drive the pump 36 through the one-way device 34 to maintain fluid pressure in the power steering system 37b to permit steering of the vehicle. This system may also accommodate power brakes so that braking of the vehicle would also be available. If the vehicle coasts backward, the output shaft 12, ring gear 68 and carrier 66 will be driven reversely. The one-way device 76 prevents reverse rotation of carrier 74 so that sun gears 56 and 58 are driven forwardly. The forward rotation of the sun gears will again cause engagement of the clutch 20 as described above which will maintain a drive through the turbine 24 and one-way device 34 to the positive displacement pump 36. If the transmission control is conditioned for a forward or reverse drive and the vehicle begins to roll, the input clutches 18 and/or 20 will be engaged by the mechanisms 80 and 82 respectively depending on the direction of travel in a manner similar to the described above for neutral. However, if the vehicle is conditioned for a drive condition opposite to actual movement, the control 37c will cause hydraulic engagement of proper devices which will cause some gear interference which will have a braking effect on the vehicle.

Obviously, many modifications and variations of the present invention are possible in light of the above teachings. It is, therefore, to be understood that within the scope of the appended claims the invention may be practiced otherwise than as specifically described.

What is claimed is:

1. A transmission for an engine driven motor vehicle comprising in combination; a pair of fluid operated input clutches; an input member drivingly connected with said input clutches; planetary gearing means operatively connected with said input clutches and being selectively operable to provide a forward drive, a reverse drive and a neutral condition; an output shaft operatively connected to the wheels of the vehicle and to the planetary gearing means; and coast drive self-energizing means operatively connected with each of said input clutches for selectively mechanically engaging said input clutches when said vehicle is coasting in said forward or reverse drive in a forward or backward direction of vehicle travel with the engine inoperative and in said neutral condition in the forward or reverse direction of vehicle travel for maintaining a drive connection between said output shaft and said input member.

2. A transmission and fluid power accessory system for an engine driven motor vehicle comprising in combination a pair of fluid operated input clutches; an input member drivingly connected with said input clutches; fluid source means operatively connected with said input member for providing fluid for the fluid system; planetary gearing means operatively connected with said input clutches and being selectively operable to provide a forward drive, a reverse drive and a neutral condition; an output shaft operatively connected to the wheels of the vehicle and to the planetary gearing means; and coast drive self-energizing means operatively connected with each of said input clutches for selectively mechanically engaging said input clutches when said vehicle is coasting in said forward, neutral or reverse drive in a forward or rearward direction of vehicle travel with the engine inoperative for maintaining a drive connection between said output shaft and said input member to maintain said fluid source means operable.

3. A transmission for an engine driven motor vehicle comprising in combination a pair of fluid operated input clutches; an input member drivingly connected with said input clutches; planetary gearing means operatively connected with said input clutches and being selectively operable to provide a forward drive, a reverse drive and a neutral condition; an output shaft operatively connected to the wheels of the vehicle and to the planetary gearing means; and coast drive self-energizing means operatively connected with each of said input clutches for selectively mechanically engaging said input clutches when said vehicle is moving in said forward or reverse drive in a forward or rearward direction respectively with the engine inoperative for maintaining a drive connection between said output shaft and said input member to provide a drive to said engine.

\* \* \* \* \*